United States Patent [19]
Acker et al.

[11] 3,731,544
[45] May 8, 1973

[54] STAR TRACKER SYSTEM

[75] Inventors: Robert H. Acker, Packanack Lake; Francis H. Murphy, Butler, both of N.J.

[73] Assignee: The Singer Company, New York, N.Y.

[22] Filed: Mar. 31, 1971

[21] Appl. No.: 129,750

[52] U.S. Cl. ............... 74/5.22, 250/203 R, 244/3.18
[51] Int. Cl. .......................... G01c 19/02, G01j 1/20
[58] Field of Search ...................... 250/203 R, 206; 74/5.22; 244/3.18

[56] References Cited

UNITED STATES PATENTS

| | | |
|---|---|---|
| 3,483,384 | 12/1969 | Pinson .............................. 250/203 R |
| 3,370,460 | 2/1968 | Haake ............................. 250/203 R X |
| 3,380,310 | 4/1968 | Tommaso et al. ..................... 74/5.22 |
| 3,564,931 | 2/1971 | Humphrey ......................... 74/5.22 X |
| 2,883,863 | 4/1959 | Karsten et al. ......................... 74/5.22 |
| 3,491,228 | 1/1970 | Selvin ........................... 250/203 R X |

*Primary Examiner*—Manuel A. Antonakas
*Attorney*—S. A. Giarratana and Thomas W. Kennedy

[57] ABSTRACT

In a star tracker system a two axis gyroscope is fixed to the stellar sensor with its spin axis aligned with the line of sight with the stellar sensor. The stellar sensor is mounted on an inertial platform by gimbals which are controlled in response to the output signals of the two axis gyroscope to maintain the line of sight of the stellar sensor aligned to an inertial reference frame. The line of sight of the stellar sensor is changed to a new position by torquing the gyroscope.

6 Claims, 3 Drawing Figures

INVENTOR
ROBERT H. ACKER &
FRANCIS H. MURPHY
BY
ATTORNEYS

STAR TRACKER SYSTEM

BACKGROUND OF THE INVENTION

Modern navigation systems, such as inertial and doppler navigation systems, have a high degree of accuracy over relatively short periods of time. In order for these systems to be accurate over longer periods of time, they need to be periodically updated with accurate position data. One method of providing this position data is by means of a star tracker. A star tracker determines the bearing and elevation of a known star. This information from two known stars will yield the position of the star tracker and thus can update the position data in an associated navigation system.

The star tracker systems of the prior art comprised a stellar sensor mounted on gimbals on the inertial platform of the navigation system. The stellar sensor functions to indicate the position of any star in its field of view relative to its line of sight. A computer and a servo system are used to position the gimbals mounting the stellar sensor so that the line of sight of the stellar sensor points at the position of a known star predicted by the navigation system. This operation will bring the star into the field of view of the stellar sensor. The bearing and elevation of the star relative to the inertial platform is determined by the position of the star in the field of view of the stellar sensor and by the angular position of the gimbals mounting the stellar sensor. The accuracy needs of the navigation system require a readout position from the gimbal axes of within three arc seconds. One arc second of error will result in a positional error of about 100 feet. In order to achieve the needed accuracy, $2^{19}$ optical encoders are normally used on the bearing and elevation axes of the gimbals which position the star tracker on the inertial platform. These encoders produce output pulses at equal angular intervals as the input shaft of the encoder is rotated. By counting these output pulses the change in angular position can be determined and by counting the pulses from a known reference angular position the angular position of the input shaft is continuously known with a resolution equal to the angular interval between pulses. A $2^{19}$ encoder is one which will produce $2^{19}$ output pulses for one revolution of the input shaft. Thus a $2^{19}$ encoder will produce output pulses at angular intervals of $360°$ $2^{19} = 2.7$ arc seconds, which is within the required accuracy of three arc seconds. $2^{19}$ encoders weigh about 10 pounds each and are about 10 inches in diameter. Accordingly, their use results in a large bulky piece of equipment. Star trackers, in addition to requiring high accuracy in the readout from the bearing and elevation axes, also require the stellar sensor to be maintained nearly motionless with respect to inertial space, or in other words at a very low inertial rate when the position of the star in the field of view of the stellar sensor is being determined. Accordingly, the relative angular rates between the inertial platform and the stellar sensor must be absorbed in the gimbals mounting the stellar sensor. In order to achieve the required low inertial rate, the star tracker systems of the prior art required a very sophisticated servo system controlling the bearing and elevation gimbals.

SUMMARY OF THE INVENTION

In accordance with the present invention, the need for large bulky transducers to read out the elevation and bearing gimbal axes and the highly sophisticated servo system to achieve a low inertial rate of the stellar sensor is eliminated. In accordance with the present invention, a two axis gyroscope is fixed to the stellar sensor with its spin axis aligned with the line of sight of the stellar sensor. A simple servo system responding to the output signals of the two axis gyroscope controls gimbals mounting the gyroscope and the star tracker. To move the stellar sensor to bring a known star into the field of view of the stellar sensor, the gyroscope is torqued to pivot its spin axis to point toward the predicted position of the star. The system controlling the positioning of the stellar sensor enables much smaller transducers with much lower resolution to be used to read out the bearing and elevation gimbal axes. For example, the same precision can be obtained in the present system with a $2^{10}$ encoder that could be obtained with a $2^{19}$ encoder in the systems of the prior art. A $2^{10}$ encoder weighs only about 1 pound and has a diameter of 1.5 inches as opposed to the 10 pound weight and 10 inch diameter of a $2^{19}$ encoder. The desired accuracy can be obtained from a $2^{10}$ encoder even though it only produces output pulses at angular intervals of 21.1 arc minutes by interpolating between output pulses of the encoder as the gyroscope is torqued.

DESCRIPTION OF THE PREFERRED EMBODIMENTS

Figure 1:
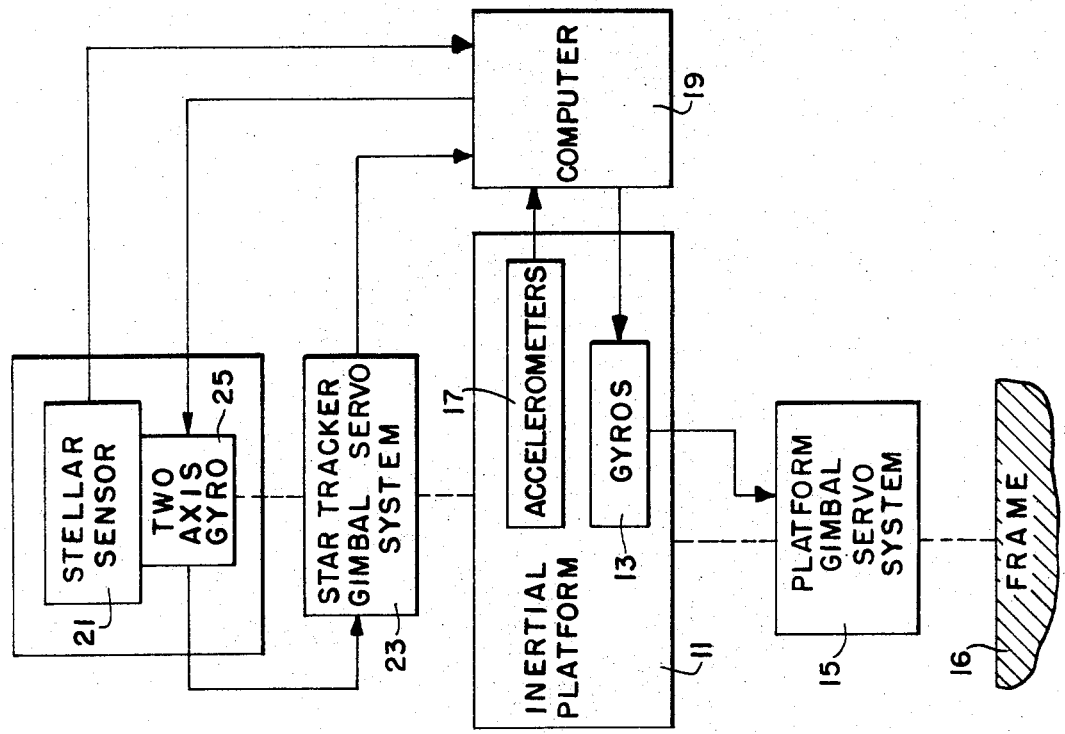
FIG. 1 is a block diagram schematically illustrating the system of the present invention.

As shown in FIG. 1, an inertial platform 11 has mounted thereon gyroscopes 13 which apply signals to a platform gimbal servo system 15. The system 15 mounts the platform 11 on the frame 16 of the vessel in which the system of the present invention is carried and responds to the output signals of the gyroscopes 13 to maintain the alignment of the platform 11 in accordance with the spin axes of the gyroscopes 13 as the vessel frame changes its angular position. Accelerometers 17 mounted on the platform 11 feed signals representing accelerations of the platform to a computer 19, which from these accelerations computes changes in position of the system. The computer 19 applies torquing signals to the gyroscopes 13 to correct for drift and to maintain the desired alignment of the spin axes of the gyroscopes 13 and thus of the platform 11. For example, the spin axis of one of the gyroscopes 13, referred to as a vertical gyroscope, might be maintained aligned with vertical and the spin axis of a second gyroscope, referred to as an azimuth gyroscope, might be maintained aligned horizontally with true north. The system thus far described is conventional in inertial and doppler navigation systems and will not be described in detail in this specification to simplify the disclosure. An example of such a system is disclosed in the Lerman et al. U.S. Pat. No. 3,281,581.

A stellar sensor 21 is mounted on the platform 11 by means of gimbals, which are included in the star tracker gimbal servo system 23 as shown in FIG. 1. A two axis gyroscope 25 is fixed to the stellar sensor 21 with its spin axis aligned with the line of sight of the stellar sensor 21. The output signals produced by the gyroscope 25 are fed to the star tracker gimbal servo system 23, which in response to the gyroscope signals rotates the support of the stellar sensor 21 and the gyroscope 25 in a manner to reduce the output signals of the gyroscope 25 to zero and thus to maintain the line of sight of the stellar sensor at a substantially fixed angle in inertial space determined by the spin axis of the gyroscope 25 and independent of changes in orientation of the platform 11. The stellar sensor 21 has a field of view adjacent to the line of sight of the star tracker and will produce an output signal representing the position of any star in this field of view relative to the line of sight of the stellar sensor. An example of such a stellar sensor is disclosed in the Brenholdt et al. U.S. Pat. No. 3,388,629. Servo system 23 includes transducers which output the relative angle between the tracker line of sight and the inertial platform 11. These signals are fed to the computer 19 which also receives the output signals from the stellar sensor 21 indicating the position of a star in the field of view of the sensor. From the signals received from the transducers of the system 23 and the stellar sensor 21, the computer can determind the azimuth and elevation of the star with respect to the platform 11.

Figure 2:
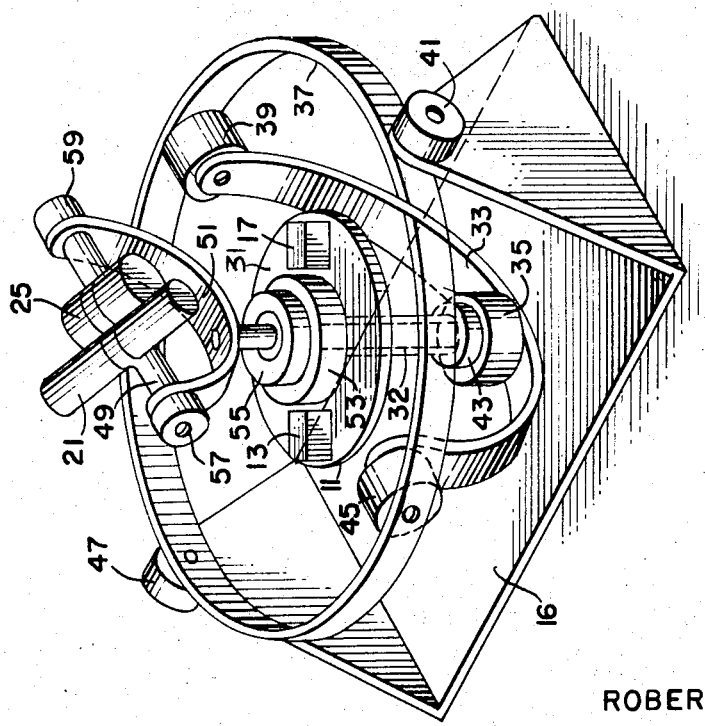
FIG. 2 is a perspective view schematically illustrating the mechanical arrangement of the present invention.

The mechanical arrangement of the apparatus of the invention can be best understood from the schematic perspective illustration of the apparatus shown in FIG. 2. As shown in FIG. 2 the platform 11, on which the gyroscopes 13 and the accelerometers 17 are mounted, is fixed to an azimuth gimbal 31 which is rotatably mounted on a pitch gimbal 33. The angular position of the azimuth gimbal 31 and the platform 11 with respect to the pitch gimbal 33 is controlled by means of a gimbal torquer 35. The axis on which the platform 11 rotates with respect to the gimbal 33 is referred to as the azimuth axis and will normally be maintained vertical by the system. The gimbal 33 is rotatably mounted in a roll gimbal 37, which is rotatably mounted with respect to the vehicle frame 16. The axis on which the pitch gimbal 33 is rotatable with respect to the roll gimbal 37 is referred to as the roll axis and is perpendicular to the azimuth axis. The axis on which the roll gimbal is rotatable with respect to the frame 16 is referred to as the roll axis and is perpendicular to the pitch axis. The angular position of the pitch gimbal 33 with respect to the roll gimbal 37 is controlled by means of a gimbal torquer 39 and the angular position of the roll gimbal 37 with respect to the frame 16 is controlled by means of a gimbal torquer 41. The gimbals 31, 33, 37 and the torquers 35, 39, and 41 comprise part of the platform gimbal servo system 15. The torquers 35, 39, and 41 are controlled in response to the output signals produced by the gyroscopes 13 to maintain the alignment of the platform 11 with respect to inertial space in accordance with the spin axes of the gyroscopes 13 as the frame 16 of the vehicle changes its angular position. The roll and pitch axes do not maintain any alignment with the input axes of the gyroscopes 13 as the frame 16 pivots with respect to the platform 11. As a result an azimuth resolver 43 is used to resolve the output signals of the vertical gyroscope into trigonometric functions representative of the relative angle between the azimuth gimbal 31 and the pitch gimbal 33. These resolved signals are then applied to torquers 39 and 41. In addition, angle transducers 43, 45 and 47 provide output signals proportional to the relative attitude between the platform 11 and the frame 16.

The stellar sensor 21 and the gyroscope 25 are fixed to an elevation gimbal 49 with the spin axis of the gyroscope 25 aligned with the line of sight of the stellar sensor 21. The elevation gimbal 49 is rotatably mounted in a bearing gimbal 51, which is rotatably mounted with respect to the platform 11 and the azimuth gimbal 31. The axis on which the elevation gimbal 49 rotates with respect to the gimbal 51 will normally be horizontal and is referred to as the elevation axis. The axis which the bearing gimbal 51 rotates with respect to the platform 11 is referred to as the bearing axis and will generally be vertical. The bearing axis is aligned with the azimuth axis and is perpendicular to the elevation axis. The angular position of the bearing gimbal 51 with respect to the platform 11 is controlled by means of a gimbal torquer 53. An encoder 55 produces output pulses representing change in the angular position of the gimbal 51 with respect to the platform 11. Since the gimbal 51 rotates with respect to the platform 11 on the bearing axis, the output pulses of the encoder 55 will represent change in the bearing of the line of sight of the stellar sensor 21 with respect to vertical as represented by the platform 11. The angular position of the gimbal 49 with respect to the gimbal 51 and thus the elevation angle of the line of sight of the stellar sensor 21 with respect to the vertical as represented by the platform 11 is controlled by means of a gimbal torquer 57. Change in the angular position of the gimbal 49 with respect to the gimbal 51 and thus change in the elevation angle of the stellar sensor 21 is represented by an output signal produced by an encoder 59.

The gimbals 49 and 51, the gimbal torquers 53 and 57, and encoders 55 and 59 comprise part of the star tracker gimbal servo system 23. The torquers 53 and 57 respond to the output signals produced by the gyroscope 25 to maintain the line of sight of the stellar sensor 21 aligned in an inertial reference frame.

Figure 3:
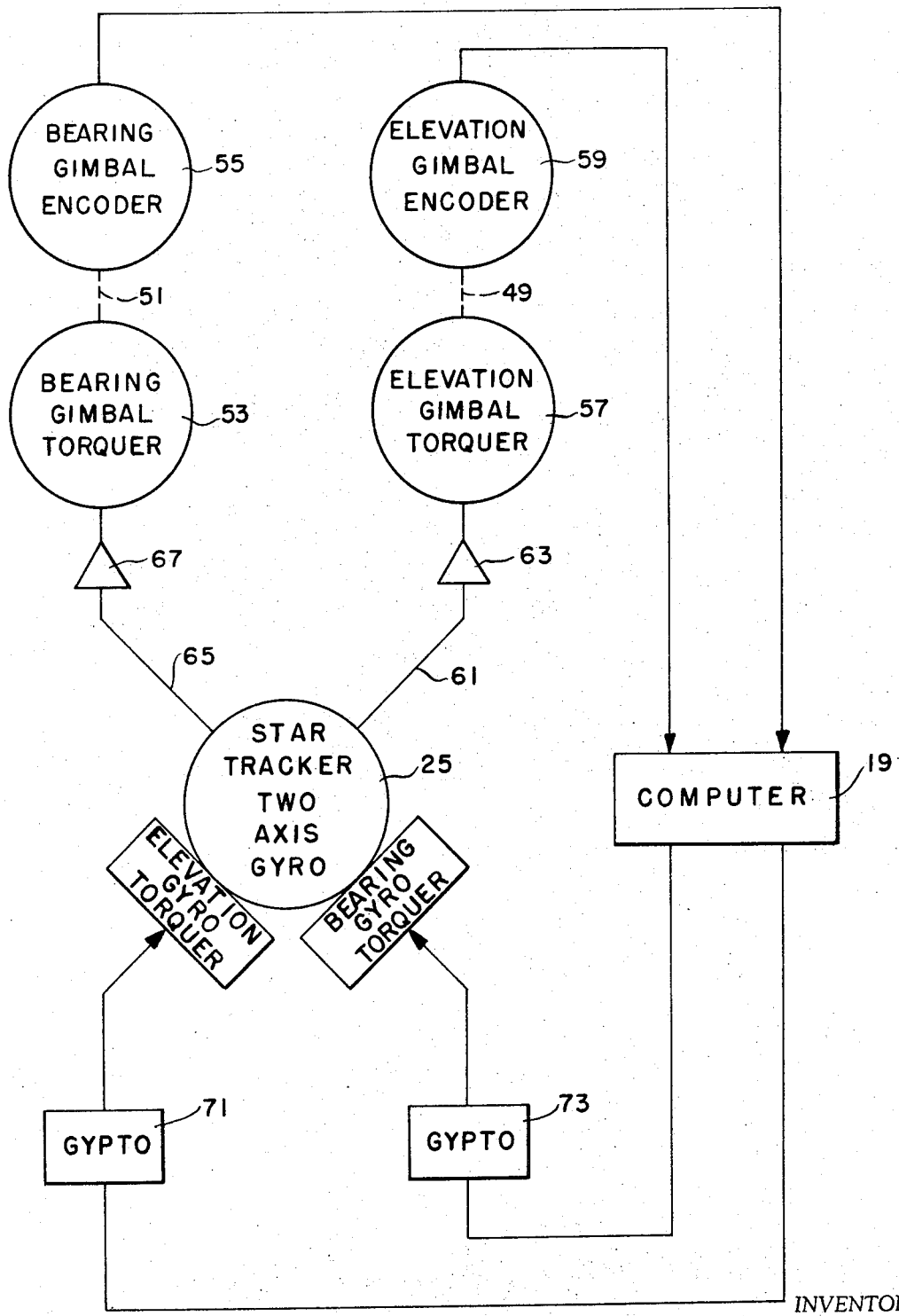
FIG. 3 is a block diagram illustrating a portion of the system of FIG. 1 in more detail.

The servo system for controlling the angular position of the gimbals 49 and 51 by means of the gimbal torquers 53 and 57 is illustrated in FIG. 3. As shown in FIG. 3 the gyroscope 25, being a two axis gyroscope, produces two output signals, one representing rotation of the gyroscope about each of its two input axes. One input axis of the gyroscope will be parallel with the gimbal elevation axis on which the elevation gimbal 49 rotates with respect to the aximuth gimbal 51. For convenience, this input axis of the gyroscope 25 shall be referred to as the elevation axis of the gyroscope. The other input axis of the gyroscope 25 is perpendicular to the elevation axis of the gyroscope and to the spin axis of the gyroscope. For convenience, this other input axis of the gyroscope 25 shall be referred to as the bearing axis of the gyroscope 25. When the angular movement of the platform 11 tends to cause the gyroscope 25 to start to pivot about its elevation axis, it will produce an output signal on channel 61 which is amplified by an amplifier 53 and applied to the elevation gimbal torquer 57. The torquer 57, in response to the received signal, will rotate the elevation gimbal 49 in a direction to reduce the output signal of the gyroscope 25 to zero, or in other words in the direction to maintain the spin axis of the gyroscope 25 fixed with respect to the inertial space as the platform 11 pivots. When the platform 11 pivots about an angle tending to cause the gyroscope 25 to pivot about its bearing axis, the gyroscope 25 will produce an output signal on channel 65, which will be amplified by the amplifier 67 and applied to the gimbal torquer 53. In response to this signal, the gimbal torquer 53 will rotate the gimbal 51 in a direction to reduce the output signal on channel 65 to zero, or in other words in a direction to maintain the spin axis of the gyroscope 25 fixed with respect to inertial space.

As shown in FIG. 3, the output pulses of the bearing gimbal encoder 55 and the elevation gimbal encoder 59 indicating change in the angular position of these gimbals and thus change the elevation and bearing of the line of sight of the stellar sensor 21 are fed to the computer 19. When it is desired to bring another known star into the field of view of the stellar sensor 21, the computer 19 determines the change in the bearing and elevation required to change the line of sight of the stellar sensor to be towards the new star. Signals representing these changes are applied to gyro pulse torquing units 71 and 73, identified by the acronym GYPTO. The signal applied to the GYPTO 71 will represent the amount of rotation required about the elevation axis of the gyroscope 25 and the signal applied to the GYPTO 73 will represent the amount of rotation required about the bearing axis of the gyroscope 25. The GYPTO 71, in response to the signal received from the computer 19, will apply pulses to the elevation torquer of the gyroscope 25 causing the gyroscope 25 to pivot about its elevation axis. Each pulse applied to the elevation torquer of the gyroscope 25 is of a precise impulse content and will cause pivoting of the gyroscope through a predetermined angle. The GYPTO 71 will apply a selected number of such pulses to cause the gyroscope to pivot about the elevation axis 25 through an angle equal to the angle represented by the signal applied to the GYPTO 71 from the computer 19. Similarly, the GYPTO 73 applies pulses to the bearing torquer of the gyroscope 25 to cause the gyroscope 25 to pivot about the bearing axis of the gyroscope 25. The GYPTO 73 will apply a selected number of constant impulse content pulses to the bearing torquer of the gyroscope 25 to cause the gyroscope 25 to pivot about the bearing axis through an angle equal to the angle represented by the signal applied to the GYPTO 23 from the computer 19.

In operation when it is desired to change the stellar sensor to a new line of sight orientation so as to point the tracker towards a known star, the computer 19 determines the present line of sight of the stellar sensor from the pulses which have been applied thereto by the encoders 55 and 59. From this information the computer determines through what angles the stellar sensor must be pivoted about the bearing and elevation axes. To change the line of sight of the stellar sensor to be toward the position of the known star predicted by the inertial navigation system, the GYPTOS 71 and 73 will apply pulses to the torquers of the gyroscope 25 to bring about this change. The known star should then come into the field of view of the stellar sensor and the stellar sensor will produce a signal representing the position of the star relative to the line of sight of the stellar sensor. The new bearing and elevation of the line of sight of the stellar sensor can be determined from the pulses applied to the computer from the encoders 55 and 59. From this information and from the signal produced by the stellar sensor, the bearing and elevation of the known star can be determined. When the bearing and elevation of two known stars have been determined in this manner, the position data in the inertial navigation system can be precisely updated.

The encoders 55 and 59 represent the change angular position of the elevation and bearing gimbals by producing an output pulse each time the corresponding gimbal has rotated through a predetermined angle. These pulses are counted by the computer 19 to keep track of the angular position of each of the gimbals. Because the encoders 55 and 59 are only $2^{10}$ incremental encoders, they produce an output pulse every 21.1 arc minutes. However, the absolute accuracy of the encoder is on the order of arc seconds each time a pulse is produced. Thus, at the time a pulse is produced by an encoder, the angular position of the corresponding gimbal will be known within seconds of an arc.

The operation by the stellar sensor in detecting the position of a star in the field of view of the stellar sensor and the representing of this position by an output signal is referred to as a star sighting. After a known star has been brought into the field of view of the stellar sensor and has been sighted and the signal representing the star position in the field of view of the stellar sensor has been applied to the computer 19, the GYPTOS 71 and 73 apply pulses to the gyroscope 25 to cause it to pivot about its elevation and bearing axes. The number of pulses applied by the GYPTO 71 to cause the gyroscope 25 to pivot about its elevation axis is counted by the computer until the elevation encoder 59 produces an output pulse. The number of pulses applied by the GYPTO 73 to cause the gyroscope 25 to pivot about its bearing axis is counted by the computer 19 until the bearing encoder 55 produces an output pulse. Thus, the precise angle through which the gyroscope 25 has pivoted about its bearing and elevation axes relative to the platform 11 from the position at which the star sighting was made will be known. Accordingly, the precise position of the line of sight of the stellar sensor relative to the platform at the time the star sighting was made could be determined from these two angles and from the angular position represented by the two encoders 55 and 59, when they produce their two output pulses if the platform 11 had no angular motion while the gyroscope 25 was being torqued from the position at which the star sighting was made and the positions at which the encoders 55 and 59 produce output pulses. The platform 11, however, will have angular motion while the gyroscope 25 is being torqued following a star sighting. The angular movement of the platform is known in the navigation system. From the angular movement of the platform 11 following a star sighting until the encoders 55 and 59 produce their output pulses, the angles through which the gyroscope 25 is pivoted by the torquing pulses following a star sighting until the encoders 55 and 59 produce output pulses, and the precise angular positions of the elevation and bearing gimbals at the times the encoders 55 and 59 produce their output pulses following a star sighting, the computer 19 can determine precisely the line of sight of the stellar sensor relative to the platform 11 at the time the star sighting was made. From this information and from the position of the star in the field of view of the stellar sensor, the precise elevation and bearing of the star relative to the platform can be determined. This is mathematically shown by the following relationships:

$$\theta_{star/platform} = \theta_T + \theta_E$$

where, $\theta_T$ is the relative angle accrued between the stellar sensor and the platform during the time between stellar sensor slew initiation and occurence of the first encoder pulse and, $\theta_E$ is the relative angle measured by the encoder between the occurence of the initial encoder pulse and a reference angle pulse.

$\theta_T$ is given by:

$$\theta_T = \Sigma \Delta \theta_{stellar\ gyro} - \Sigma \Delta \theta_{platform}$$

where, $\Delta \theta_{stellar\ gyro}$ are the incremental pulses applied to the stellar gyro between initialization of tracker slew and incidence of the first encoder pulse and;

$\Delta \theta_{platform}$ is the summation of platform pulses as resolved about the stellar gyro axes during the period between initiation of slew and incidence of the first pulse.

These computations are accomplished completely within the navigation computer utilizing information available within the computer and supplemented only by the encoder pulses emanating from the stellar gimbal axes.

The same technique is applied for both determination of stellar line of sight position with respect to the platform axes as well as for repositioning of stellar sensor for multiple star applications with the only variable being the value of the reference pulse which is a function of whether a stellar measurement is being made or whether stellar repositioning is being undertaken. This value is controlled by the computer. In this manner the system of the present invention is used to determine precisely the line of sight of the stellar sensor within a few arc seconds even though $2^{10}$ encoders are used on the bearing and elevation gimbals. From two star sightings, precise positional data is obtained from which the computer is updated.

When the stellar sensor cannot be used to determine a star position such as because of cloud cover or because of failure of the stellar sensor, the gyroscope 25 can be used to calibrate the gyroscopes of the inertial navigation system continuously during flight and thereby improve navigation performance and azimuth alignment of the navigation system. To calibrate a vertical gyroscope in the navigation system, the gyroscope 25 is first torqued to a position in which the elevation gimbal is at 90° as indicated by the encoder 59 so that the axis of the gyroscope 25 is aligned with the spin axis of the vertical gyroscope mounted on the platform 11. The elevation gimbal is then locked in this position. The input axes of the gyroscope 25 will then be horizontal according to the inertial platform. The bearing gimbal is then rotated by its torquer until the input axes of the gyroscope 25 are aligned with the input axes of the vertical gyroscope on the platform 11. The bearing gimbal is then locked in this position and the gyroscope 25 is connected in the rate capture mode, in which the output signals of the gyroscope are used to torque the gyroscope in the direction to reduce the output signals of the gyroscope 25 to zero. Resulting torquing currents applied to the gyroscope 25 will then indicate the rate of rotation of the gyroscope 25 about its input axes and thus will indicate the rate of rotation of the vertical gyroscope on the platform 11 about its input axes. After these rates have been determined, the bearing gimbal is rotated through 180° reversing the alignment of the input axes of the gyroscope 25 with the input axes of the vertical gyroscope. The same rate measurements are again made with the gyroscope 25 in the rate capture mode. From these measurements, the drift of the vertical gyroscope and its misalignment can be determined. To calibrate the azimuth gyroscope, the bearing gimbal is locked at 0° and the elevation gimbal is locked at 0° so that the spin axis of the gyroscope 25 is horizontally aligned with the spin axis of the azimuth gyroscope. The gyroscope 25 is again connected in a rate capture mode to determine the rate that the azimuth gyroscope is being pivoted. The elevation gimbal is then moved to 180° to reverse the position of the gyroscope 25 and the rate measurement is again made. From these measurements the drift of the azimuth gyroscope can be computed and corrected.

In the event of failure of any of the gyroscopes on the inertial platform, the gyroscope 25 can be used to replace a defective gyroscope. The bearing and elevation gimbals will be locked with the spin axis of the gyroscope 25 aligned with the spin axis of the defective gyroscope. Navigation torquing functions will then be applied to the gyroscope 25 instead of to the defective gyroscope.

In the event of failure of one of the encoders 55 or 59, the gyroscope 25 can be utilized to retain stellar sensor line of sight position accuracy by retaining within the computer the accumulation of the summed torquing pulses applied to the gyroscope 25. This is possible because the gyroscope 25 inherently provides an inertial reference frame of measurement.

The system of the present invention makes possible an extremely simple bearing and elevation servo design since the computer is not utilized in the servo loop. In addition, the size and weight of the encoders on the bearing and elevation gimbals is greatly reduced. Moreover, the system permits the gyroscopes on inertial platform to be continuously calibrated. In the event of failure of one of the gyroscopes, the gyroscope 25 can be used in place of the defective gyroscope.

In the system described above, the stellar sensor determines the position of the star in its field of view by scanning the field of view. This scanning is often carried out electromechanically as it is in the Brenholdt et al. U.S. Pat. No. 3,388,629. The gyroscope 25 can be used to eliminate the need for the electromechanical scanning mechanism. The scan could be performed by applying the desired scan function to the torquer of the gyroscope 25 under the control of the computer. The line of sight of the stellar sensor would then oscillate through the field of view until a star is recognized. The angular position of the stellar sensor line of sight at this instant could then be obtained from interpolation of the summed gyro torquing pulses between encoder output pulses. The utilization of the gyroscope 25 to provide the scan pattern would eliminate a great deal of complexity in the electronics of the stellar sensor and thus integrate the tracking function within the computer.

Many modifications may be made to the above-described system without departing from the spirit and scope of the invention, which is defined in the appended claims.

We claim

1. In combination with an inertial navigation system including a frame, a gimbal servo system mounted on said frame, an inertial platform mounted on said gimbal servo system, platform gyro means mounted on said inertial platform, a computer operatively connected to said platform gyro means, stellar sensing means operatively connected to said computer to sense a star position, a gyroscope fixed to said stellar sensing means and operatively connected to said computer, and gimbal means operatively connected to said computer and mounting said gyroscope and said stellar sensing means on said platform and responsive to the output of said gyroscope to maintain the line of sight of said stellar sensing means in a predetermined alignment with said gyroscope as said inertial platform pivots with respect to said gyroscope, wherein said gimbal means comprises first and second gimbals, and wherein said gimbal servo system includes third and fourth and fifth gimbals, said first gimbal rotatably mounting said stellar sensing means and said gyroscope on said second gimbal, said second gimbal being rotatably mounted on said third gimbal, said third gimbal being rotatably mounted on said fourth gimbal, said fourth gimbal being rotatably mounted on said fifth gimbal, said fifth gimbal being rotatably mounted on said frame, and torquing means responsive to the output of said gyroscope to control the angular positions of said gimbals.

2. In a combination as recited in claim 1 wherein said gyroscope has its spin axis aligned with the line of sight of said stellar sensing means.

3. In a combination as recited in claim 1 wherein said gyroscope comprises a two axis gyroscope.

4. In a combination as recited in claim 3 wherein the spin axis of said gyroscope is aligned with the line of sight of said stellar sensing means.

5. In a combination as recited in claim 1 wherein said first and second and third and fourth and fifth gimbals respectively have first and second and third and fourth and fifth torquers and respectively have first and second and third and fourth and fifth angle transducers, said torquers and said angle transducers being operatively connected to said computer, said first and second angle transducers further comprising first and second encoders to produce output signals representing the changes in the angular positions of said first and second gimbals.

6. In a combination as recited in claim 5 wherein said first and second encoders produce output pulses at equal angular increments of rotation of said gimbals.

* * * * *